Feb. 13, 1968   L. G. MAMAS   3,368,593
ORIGINATING FILLER IDENTIFICATION SYSTEM
Filed Oct. 9, 1964
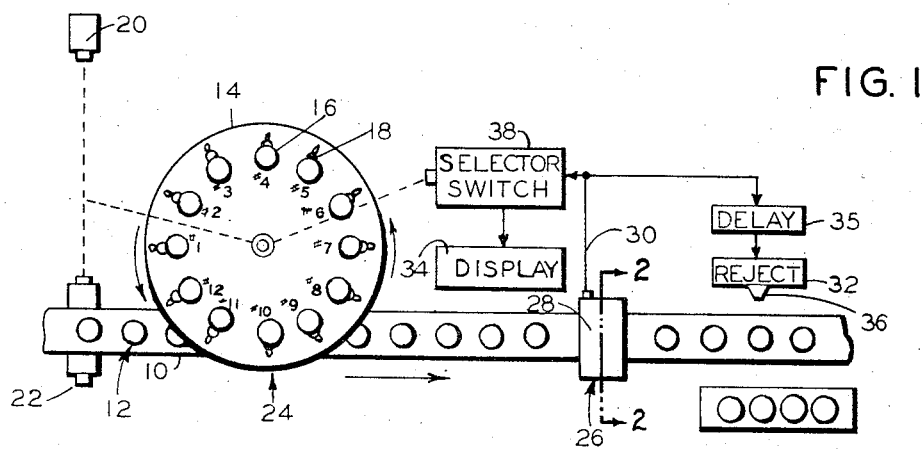
FIG. 1
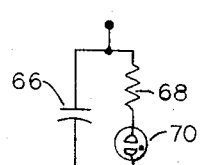
FIG. 5
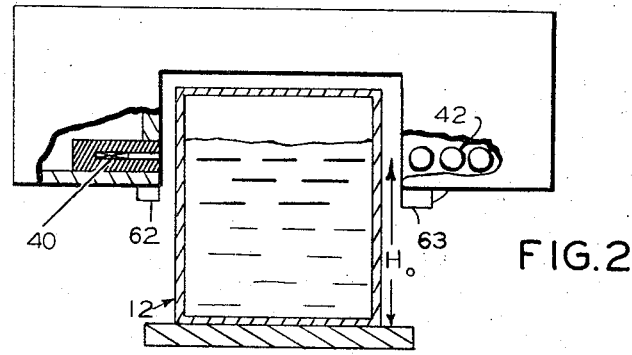
FIG. 2
FIG. 3
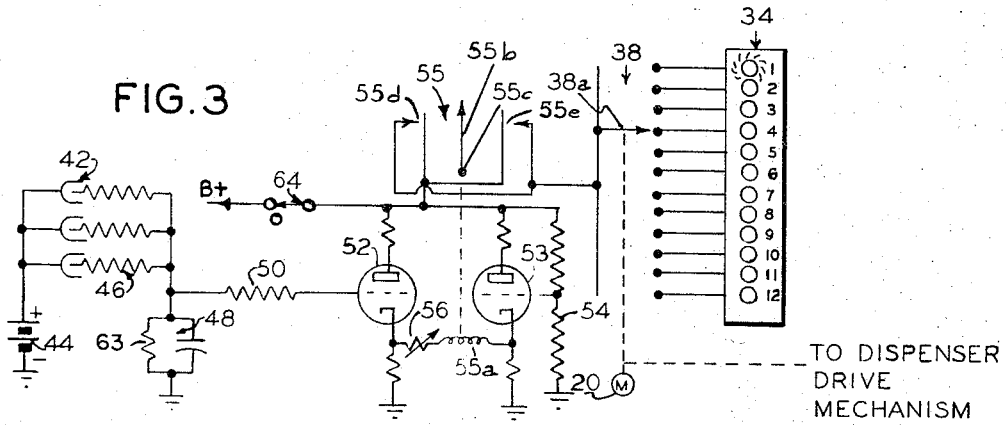
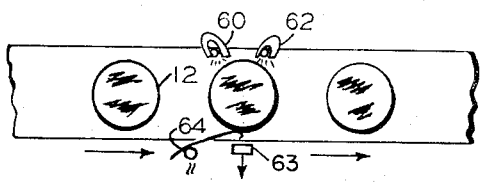
FIG. 4
Inventor
Leo G. Mamas
By James J. O'Reilly
Agent United States Patent Office 3,368,593
Patented Feb. 13, 1968

3,368,593
ORIGINATING FILLER IDENTIFICATION SYSTEM
Leo G. Mamas, Columbus, Ohio, assignor to Industrial Nucleonics Corporation, a corporation of Ohio
Filed Oct. 9, 1964, Ser. No. 402,851
8 Claims. (Cl. 141—83)

This invention relates generally to automatic dispensers for filling containers and more particularly to apparatus for identifying one or more misadjusted volumetric filling pockets associated with improperly filled containers.

In present day filling operations, it is desirable to dispense at least a specified amount of material or liquid into a container such as a bottle, can or box. The amount is required by law to be stamped on the container; any excess dispensed results in a loss to the packager. While there are many varieties of dispensers commercially available, my invention is particularly directed to those that use a plurality of controllable volume pockets into which the material is measured before being placed in the container. One example is the rotary type in which a rotatable dispenser is provided with a number of filler pockets located around the periphery thereof. Each pocket is positioned in turn over a container passing beneath and the contents of the pocket are emptied into the container. The filled container passes downstream to a collection point and the originating pocket is refilled for another container.

Since the volume of the pockets cannot be continuously maintained, the content weight of the subsequently filled containers varies considerably. Apparatus has already been designed for inspecting and rejecting improperly filled containers, i.e., those either failing to meet the minimum specified weight or exceeding a maximum fill level above which the packager suffers an economic loss. U.S. Letters Patent 3,001,076, issued Sept. 19, 1961, to J. G. Crump, and U.S. Letters Patent 3,007,048, issued Oct. 31, 1961, to R. A. Knapp et al., both assigned to the same assignee as the present invention, are two examples of automatic inspection and control of opaque or sealed containers. Patentees either reject improperly filled containers as taught by Crump or they control the average fill placed in several containers as taught by Knapp et al.

My invention provides for individual control of the filling of each container. First of all, I determine the presence of an improperly filled container at an inspection point downstream from the dispenser. Then by knowing the time required to transport a given container to the inspection point from the filling point, I determine which of the measuring pockets originated the objectionable container for the purpose of making suitable manual or automatic adjustments of the pocket's measuring volume.

Accordingly, it is a primary object of the present invention to provide apparatus for identifying a misadjusted filler pocket originating an objectionable container.

It is another object of the present invention to provide apparatus for a container filling process that results in fewer rejected containers per unit time.

It is yet another object of the present invention to provide a dispenser pocket identifier system that is inexpensive to build and operate.

It is an additional object of the present invention to provide a rotary dispenser control system that can be constructed of standard components.

These and other objects of the present invention will become more apparent upon reference to the following description taken in conjunction with the accompanying drawings, in which:

FIG. 1 is a top view partly diagrammatic of a container filling process illustrating the construction of the present invention;

FIG. 2 is a detailed sectional view of a preferred inspection unit useful in the process shown in FIG. 1;

FIG. 3 is a schematic diagram of inspection and display circuitry useful in the process shown in FIG. 1; and FIG. 4 is a top plan view taken at the container inspection station;

FIG. 5 is a schematic diagram of a memory circuit.

Referring now to the drawings and specifically to FIG. 1, a container filling line includes a conveyor belt 10 for transporting empty cans 12 beneath a rotating dispenser housing 14. A plurality of measuring pockets 16 are spaced around the periphery; the volume of each pocket is adjustable by means of an actuator member 18. A reservoir (not shown) is mounted above the pockets to refill each pocket with material. A drive motor 20 is geared to both a conveyor drive roller 22 and the hub of the rotating dispenser housing. The cans are spaced apart so that each comes directly beneath one of the revolving pockets 16. Each pocket in turn dumps its volume of material into the can at the filling point 24. The pocket is gradually refilled from a reservoir (not shown) during its subsequent journey around the hub. Meanwhile the filled can originated by that filler pocket travels downstream on the conveyor 18 to an inspection point 26 where a gauge 28 examines the fill level of each can. Whenever a can passes having a low fill level, a reject signal is provided on line 30. The reject signal is transmitted to both a reject unit 32 and a display unit 34. After a suitable delay time proportional to the separation between the inspection and the rejection unit and set by delay unit 35, a kicker member 36 knocks the objectionable container from the conveyor belt.

The display unit 34 may be any aural or visual device that identifies the pocket from which the rejected can was filled. Bells, counters, lamps, buzzers or even automatic typewriters may be used. Having this information, the operator can manually adjust the appropriate actuator member. Of course, automatic adjustment can be made if desired. In a preferred form of display, a plurality of indicator lamps are selectively energized by the reject signal through a switch member 38 geared to the rotating dispenser wheel 14.

Before the switching and display circuitry is explained, it is appropriate to examine how the rejection signal is derived. For purposes of simplicity, the operation of the inspection unit is restricted to the case of determining only those fill levels that fall below a pre-established minimum fill height $H_0$. It is appreciated that not only underfills but also overfills could effect a can rejection. It is also appreciated that the inspection could be performed by an operator stationed at the inspection point. The operator would simply push a button whenever he spots an improperly filled container. This system will not work, however, on opaque closed containers. It is necessary to perform this function by other than visual means.

Referring now to FIGS. 2 and 3, the heart of the preferred gauge 28 comprises a thin source of radiation 40 and three Geiger-Mueller tubes 42 mounted so that each can passes in-between. The G-M tubes define with the source 40 an essentially horizontal beam of radiation intersecting the cans 12 at a level $H_0$ above the conveyor belt surface. If each can is filled above the source-detector plane, little radiation from the source strikes the tubes 42 and the output current generated by the tubes approaches zero. A drop in fill level below $H_0$ eventually exposes the G-M tubes to the full beam of radiation and a relatively large current flows.

In FIG. 3, the fill level signal current from the G-M tubes is provided by a battery 44. Isolating resistors 46 are connected in series with the G-M tubes 42. An R-C integrator 48 and grid current limiting resistor 50 are connected in the grid circuit of a triode 52. Another triode 53 is provided with a grid potentiometer 54 that effectively controls the plate current through the tube. A signal coil 55a of a contact meter 55 is connected between the cathodes of triodes 52 and 53 to register an unbalance in their rsepective plate currents caused by changes in detected radiation. A potentiometer 56 is connected in series with the signal coil 55a of the contact meter to adjust the span thereof. The signal coil 55a carries the indicator needle 55b that is pivotally mounted at 55c. High and low limit contacts 55d and 55e are made when the indicator needle reaches either one end or the other of the scale. The making of either contact causes B+ to be applied to the switch rotor arm 38a. A lamp will be lit when either an overfilled or an underfilled container is detected. Contact hold coils for the meter 55 are not required since a memory function is provided by the display device in a manner described hereinafter.

The G-M tubes 42 are pulsed with an intense radiation beam when there is a space between the containers at the inspection point 26. To prevent an erroneous low level indication, I provide a photoelectric reset means as shown in FIG. 4. This system is described in U.S. Patent 2,999,591, issued Sept. 12, 1961, to J. G. Crump and assigned to the same assignee as the present invention, briefly, a pair of spaced light sources 60 and 62 mounted on one side of the conveyor 10 and directed toward a photoresistive element 63 located on the other side of the conveyor. The photocell system is mounted directly beneath the radiation source-detection system shown in FIG. 2. During the time a space is located between the source 40 and the G-M tubes 42, light energy from both light sources strikes the photoresistor 63 drastically reducing its resistance. The photoresistor 63 comprises the resistive load for the G-M tubes 42 as shown in FIG. 3. As a container 12 moves in-between the lights 60, 62 and photoresistor 63, the resistance of the photoresistor 63 increases and a sizeable signal voltage can be developed at the grid of triode 52 in accordance with the detected radiation. The resistance decreases before the container moves completely away, since light energy from the light source 60 will strike the photoresistor 63. It is important that the low light resistance be such that a potential is developed at the grid of triode 52 that is identical with that already established at the grid of triode 53. If it is not, the contact meter may register an over-filled container. This may possibly effect an erroneous display when the rotor arm 38a steps to the next position. Alternatively, a mechanical feeler switch 64 can be mounted adjacent to the containers 12 passing the inspection point 26 to apply B+ to the triodes and indicator circuitry only when a container is positioned in the radiation beam. This eliminates the need for a photocell integrator reset system and may be more advisable in certain applications.

The distributor switch 38 may be of the rotary type having as many fixed contacts as there are filler pockets. Each contact is connected to an indicator bulb in the display unit 34. The rotor arm 38a scans each contact at a speed dictated by the dispenser drive motor 20. A low can will cause the meter contacts to close connecting the D.C. supply to the switch rotor 38a. The display can be energized from the reject device 32, but if it fails to reject, the board 34 will fail to register the troublesome pocket. The lamp corresponding to the misadjusted pocket will be ignited provided the time of can transport from the filling point 24 to the inspection point 26 is accounted for. For example, assuming there are seven cans between the filling point and the inspection point, when pocket #10 is dispensing, the can filled by pocket #4 is being inspected and lamp #4 is connected to the rotor arm 38a as shown. This is a type of built-in transport delay. Other electronic devices may be used to provide the same function.

In addition, I provide in FIG. 5 an electronic memory circuit to keep the indicator on long enough to be seen by the operator. This could comprise a parallel capacitor 66 connected across a resistor 68 in series with a neon bulb 70. Other memory devices may be employed with equal utility. Values of resistance and capacitance should be selected such that the bulb extinguishes before the pocket comes around to the filling station. By watching the panel, the operator is advised by a repeatedly flickering light that a certain filler pocket requires a volumetric correction.

In summary, the apparatus of the present invention provides an operator with valuable process information whereby he can quickly correct the troublesome pocket without interfering with correctly adjusted ones. While only a rotary filler has been illustrated, it should be appreciated that the present invention can be used with other types. For example, filler having two or more pockets arranged in line can be reciprocated over the passing containers, one pocket empty while the others are filling. If there are only two pockets, the job of identifying which one is responsible for incorrectly filling the containers is not so difficult. Nevertheless, the present invention immediately identifies the pocket.

While the present invention has been described in terms of a preferred embodiment, it is apparent that many additions, deletions and substitutions may be made therein without either detracting from the true spirit and scope of the present invention or relinquishing any of the advantages attendant thereto.

What is claimed is:

1. A material dispenser having a plurality of filler pockets each one of which periodically originates a filled container by filling one of a number of containers passing adjacent to said pockets, apparatus comprising:
   means to be located downstream from said dispenser for individually examining each of said filled containers and for generating a signal whenever one of said examined containers is improperly filled,
   a display having separate indication means designating each of said filler pockets, and
   switch means responsive to said signal for selectively energizing said indicator means designated for said filler pocket originating said improperly filled container.

2. A material dispenser having a plurality of filler pockets each one of which periodically originates a filled container by filling one of a number of containers passing adjacent to said pockets, apparatus comprising:
   means to be located downstream from said dispenser for individually examining each of said filled containers and for generating a signal whenever one of said examined containers is improperly filled,
   display unit having a separate indicator designated for each of said filler pockets, and
   switch means synchronized with said container filling operation for connecting said signal to said display unit to energize said separate indicator designating said filler pocket originating said improperly filled container.

3. Apparatus as set forth in claim 2 in which each of said separate indicators comprises an electric lamp, and said switch means includes a circuit having a source of power for said lamps and first and second switching devices, said first switching device sequentially coupling said power source through said second switching device to each of said lamps, said second switching device being closed when an improperly filled container is examined, energizing the lamp connected to said first switching device, said first switching device being synchronized to connect sequentially to the lamp designated for the sequence of filler pockets originating the examined container, said circuit having means to maintain the energized lamp energized for a period of time after the first switching device sequences to another lamp to permit observation by an operator.

4. Apparatus as set forth in claim 2 in which said switch means comprises a stepping switch, with a separate contact on said stepping switch for each of said lamps and a moving contact, a source of power for said lamps, circuit means connected with each of said moving contact, said power source, and said lamps to connect said power source to the lamp designated for the filler pocket producing the container that initiates said signal.

5. Material dispensing apparatus comprising:
a moving filler having a plurality of pockets each one periodically originating a filled container by filling one of a number of containers passing adjacent thereto,
means to be located downstream from said filler for inspecting the fill level of each of said filled containers and for generating a signal whenever any of said inspected containers is improperly filled,
a display unit having separate indicator means designated for each of said filler pockets and responsive to said signal,
switch means synchronized with said periodic filling of said containers and said inspection thereof for coupling said signal to the indicator means designated for said filling pocket originating said improperly filled container.

6. Liquid dispensing apparatus comprising:
a rotary filler having a plurality of pockets around the periphery thereof revolving at a substantially constant velocity, each pocket operative to periodically originate a filled container by dispensing the contents of said pocket into one of a plurality of containers passing adjacent to said pocket on a line substantially tangent to said filler periphery,
means to be located downstream on said line from said filler for inspecting the fill level of each of said filled containers and for generating a signal whenever one of said inspected containers is improperly filled,
a display unit having separate indicator means including a plurality of lamps operative to be energized by said signal and means for identifying each of said lamps with one of said filler pockets, and
switch means synchronized with said periodic filling of said containers and said inspection thereof for connecting said signal to said indicator lamp identified with said pocket originatng said improperly filled container.

7. Apparatus as set forth in claim 6 which further includes holding circuit means in parallel with each of said indicator lamps for maintaining the same energized for a predetermined length of time.

8. Material dispensing apparatus comprising:
a rotary filler having a plurality of pockets around the periphery thereof revolving at a substantially constant velocity, each pocket operative to periodically origiante a filled container by dispensing the contents of said pocket into one of a plurality of containers passing adjacent to said pocket on a line substantially tangent to said filler periphery,
means to be located downstream on said line from said filler for inspecting the fill level of each of said filled containers and for generating a signal whenever one of said inspected containers is improperly filled,
separate indicator means including a plurality of lamps operative to be energized by said signal and means for identifying each of said lamps with one of said filler pockets, and
switch means synchronized with said periodic filling of said containers and said inspection thereof for connecting said signal to said indicator lamp identified with said pocket originating said improperly filled container, said switch means comprising a distributor switch having a rotor arm driven in accordance with said periodic container filling operation.

References Cited
UNITED STATES PATENTS

| 1,876,109 | 9/1932 | Van Der Pol | 315—241 X |
| 2,142,920 | 1/1939 | Rose | 209—82.1 |
| 2,901,209 | 8/1959 | Brady et al. | 141—144 X |
| 3,007,048 | 10/1961 | Knapp et al. | |
| 3,115,165 | 12/1963 | Cunningham et al. | 141—83 |

LAVERNE D. GEIGER, *Primary Examiner.*

E. J. EARLS, *Assistant Examiner.*